United States Patent [19]

Straub

[11] Patent Number: 4,696,791
[45] Date of Patent: Sep. 29, 1987

[54] NUCLEAR REACTOR INSTALLATION

[75] Inventor: Hermann Straub, Winterthur, Switzerland

[73] Assignee: Sulzer Brothers Limited, Winterthur, Switzerland

[21] Appl. No.: 756,033

[22] Filed: Jul. 17, 1985

[30] Foreign Application Priority Data

Jul. 17, 1984 [CH] Switzerland .................. 3468/84

[51] Int. Cl.[4] ............................................. G21C 9/00
[52] U.S. Cl. ..................... 376/299; 376/282; 376/298; 376/406
[58] Field of Search ............... 376/282, 283, 298, 299, 376/328, 368, 406, 336

[56] References Cited

U.S. PATENT DOCUMENTS

| 3,245,879 | 4/1966 | Purdy et al. | 376/406 |
| 3,290,222 | 12/1966 | Schoesson et al. | 376/282 |
| 3,312,596 | 4/1967 | Grain | 376/283 |
| 4,526,742 | 7/1985 | Hannerz | 376/406 |

FOREIGN PATENT DOCUMENTS

| 2625543 | 12/1976 | Fed. Rep. of Germany | 376/328 |
| 1273559 | 5/1972 | United Kingdom | 376/283 |

Primary Examiner—Deborah L. Kyle
Assistant Examiner—Richard W. Wendtland
Attorney, Agent, or Firm—Kenyon & Kenyon

[57] ABSTRACT

The nuclear reactor installation is provided with a double-wall pressure vessel which is surrounded by a heat sink. A flood tank is provided outside the vessel in order to supply air as a heat-insulating agent to the chamber defined by the pressure chamber wall during normal operation and to supply water as a heat-conductive agent in response to a disturbance in reactor core cooling.

The cover on the pressure vessel is also provided with a chamber to which air or water can be delivered. A closure member which can be activated by fusible element is incorporated in the cover to permit flooding of the cover chamber in response to an excessive heat within the pressure vessel.

14 Claims, 6 Drawing Figures

NUCLEAR REACTOR INSTALLATION

This invention relates to a nuclear reactor installation.

As is known, nuclear reactor installations have been constructed to generate relatively low power, for example of the order of some ten to fifty megawatts (MW) for use near load centers. One known installation includes a pressure vessel which houses a nucelar reactor core and at least one primary heat exchanger of a cooling circuit through which a secondary coolant flows. The cooling circuit also employs at least one secondary heat exchanger outside of the pressure vessel and coolant lines which pass through the pressure vessel to communicate the heat exchangers with each other. In addition, a heat sink has been provided around the pressure vessel. Generally, the heat sink has been constructed in the form of a water-filled pool which is bounded by a concrete containment to ensure adequate radiation protection. For satisfactory efficiency of the installation, the reactor has been insulated from the heat sink.

In the event that a disturbance should occur in the reactor cooling, an after-heat evolves. Usually, this after-heat is removed by means of a special heat exchanger disposed outside the pressure vessel but inside the containment in the water of the heat sink. This heat exchanger, therefore, communicates by way of lines with the pressure vessel in order to ensure circulation of the reactor coolant in the core and in the het exchanger. Further, as an earthquake protection measure, this heat exchanger must also be rigidly connected to the pressure vessel in a mechanical manner. Means are also necessary to ensure that the heat exchanger is inoperative during normal operation of the reactor coolant and is cut into the cooling circuit in the event of a disturbance in the reactor cooling.

However, the presence of a special heat exchanger with the associated mechanical and line connections to the pressure vessel as well as the means for cutting the heat exchanger into and out of operation require extensive construction at substantial cost. Further, in the event of a fracture in the heat exchanger or connecting line, contaminated reactor coolant may reach the water of the heat sink. This event must be prevented in order to ensure radiation safety.

Accordingly, it is an object of the invention to improve the construction of a nuclear reactor installation in a simple and economical manner.

It is another object of the invention to be able to remove any after-heat which occurs in the event of a failure of a normal cooling of a reactor core in accordance with very strict safety regulations.

It is another object of the invention to provide for a rapid cooling of a reactor core and vessel in the event of a distrubance to normal reactor cooling.

It is another object of the invention to eliminate the need for a special heat exchanger for an emergency cooling of a reactor core.

Briefly, the invention provides a nuclear reactor installation which includes a pressure vessel having a pair of walls defining a peripheral chamber therebetween, a reactor core disposed within the pressure vessel for heating a primary coolant, a source of at least one flowable heat-insulating agent outside the pressure vessel, a source of at least one flowable heat-conductive agent outside the pressure vessel, a first means communicating the source of heat-insulating agent with the peripheral chamber of the vessel during normal operation of the reactor core and second means communicating the source of heat-conductive agent with the peripheral chamber to fill the chamber with heat-conductive agent in response to a distrubance in reactor core cooling.

In the event of a disturbance to reactor core cooling, the heat insulation necessary to maintain high efficiency in normal operation can be replaced by a filling of heat-conducting agent. In this way, any after-heat can be removed directly through the double-walled pressure vessel into a heat sink around the vessel. Thus, no special heat exchanger is required. Further, the amount of construction required is reduced considerably. Also, safety considerations are taken care of better than in the previously known installations for the reason that, in the event of a disturbance of the above kind, no reactor coolant has to be removed from the pressure vessel in order to remove the afterheat.

The double-walled construction of the pressure vessel also provides another factor in increasing safety. Also, the installation can be made inherently safe, i.e., safety is provided in a natural way automatically and is unaffected by external influences.

The installation may utilize a heat sink which is in the form of a pool of water. Alternatively, the heat sink may also be in other forms, such as in the form of natural rock, for example, if the installation is placed in a rock cave.

The installation also includes a cooling circuit for conveying a secondary coolant in heat exchange relation with the primary coolant. This circuit includes at least one primary heat exchanger within the pressure vessel, at least one secondary heat exchanger outside the pressure vessel, coolant lines which extend through the pressure vessel and connect the heat exchangers together and circulating means for circulating a secondary coolant through the heat exchangers.

A prefered embodiment of the installation includes a flood tank disposed geodetically higher than the reactor core with water in the tank serving as the source of heat-conductive agent and air in the tank serving as a source of heat-insulating agent. In this case, the internal volume of the tank is greater than the internal volume of the peripheral chamber of the vessel. In addition, the means for communicating the heat-insulating agent is in the form of a blower located between the flood tank and a top end of the peripheral chamber of the pressure vessel. In this embodiment, in the event of a disturbance, gravity can be used, after the blower has been stopped to fill the peripheral chamber with water with a simultaneous displacement of the air.

The installation also includes a cover which is removably mounted on the peripheral walls of the pressure vessel and which itself has a pair of walls defining a chamber therebetween. In addition, means are provided to communicate the chamber in the cover with the peripheral chamber of the pressure vessel. In addition, a first line communicates the source of air in the flood tank with the chamber in the cover while a second line communicates the source of water in the flood tank with the peripheral chamber at a bottom end thereof. In this construction, the coolant lines of the cooling circuit extend through the cover and an end wall which connects the pressure vessel walls at the upper end. The provision of the removable cover ensures for very ready access to the interior of the pressure vessel without impairing the general safety of the reactor.

The peripheral chamber defined by the double wall of the pressure vessel may also include a cylindrical guide wall in order to define a convection flow path for water within the chamber. Thus, in the event of a failure of all the reactor cooling systems, a natural convection flow may take place within the pressure vessel wall so as to improve heat exchange.

The pressure vessel may also be provided with a plurality of external cooling ribs in order to define a bearing and transport structure as well as a crushable zone in order to protect the reactor against external mechanical effects. The ribs thus not only improve heat exchange through the double wall of a pressure vessel in the event of a failure of the cooling systems but also enhances reactor safety, particularly during transportation.

A radiation shield may also be disposed about the reactor core within the pressure vessel in order to render the installation more compact.

Where the heat sink is a water-filled pool, a check valve may be provided to communicate the flood tank with the pool in order to fill the flood tank with water from the pool and/or fill the peripheral chamber of the pressure vessel without any impairment of safety requirements.

The installation may also utilize at least one closure element which is movable under gravity from a normal operating position sealing the peripheral chamber from the exterior of the vessel to a safety position opening the peripheral chamber to a source of water exterior of the pressure vessel. In this case, a bearing element is provided to hold the closure element in the normal operating position while being thermally exposed to the interior of the pressure vessel. The bearing element is further made of a fusible material in order to melt in response to a predetermined safety temperature being exceeded within the pressure vessel in order to allow the closure element to move into the safety position. This construction aids in improving the inherent safety of the installation.

These and other objects and advantages of the invention will become more apparent from the following detailed description taken in conjunction with the accompanying drawings wherein.

Figure 1:
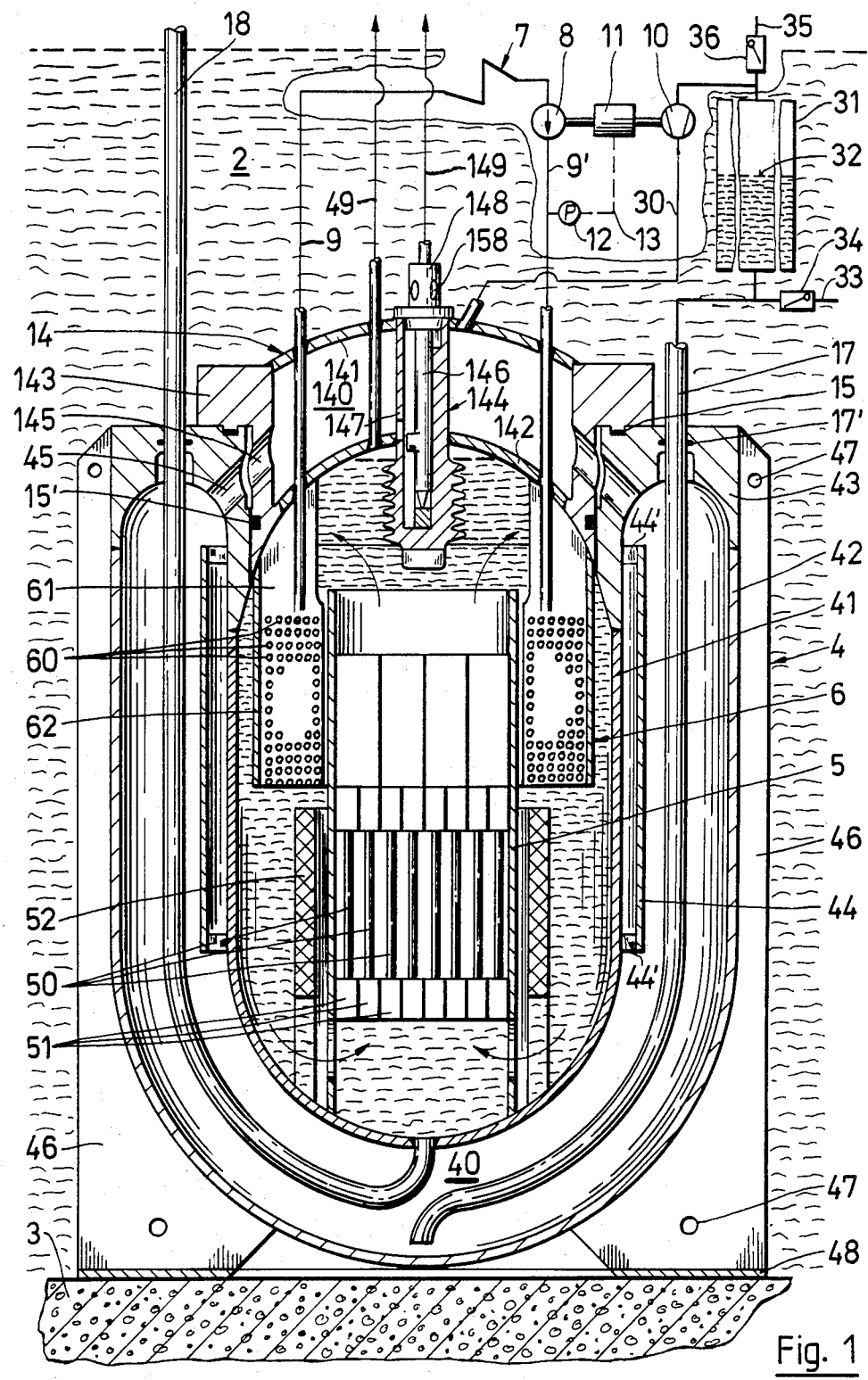
FIG. 1 illustrates a diagrammatic vertical section through a heating reactor installation according to the invention.
Figure 2:
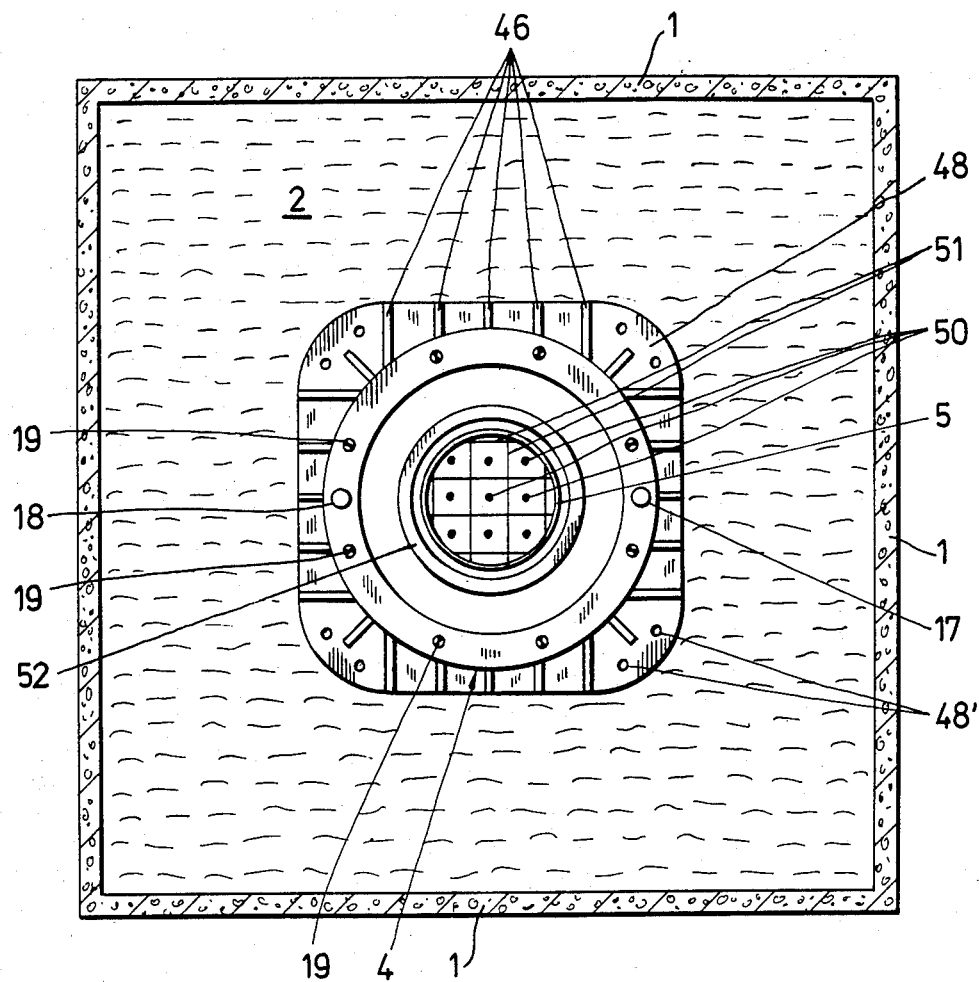
FIG. 2 illustrates a diagrammatic plan view of the installation to a smaller scale than FIG. 1, with the cover of the heating reactor removed.

Referring to FIGS. 1 and 2, the nuclear reactor installation has a nuclear heating reactor disposed in a pool 2 which is filled with demineralized water and which is contained by four concrete walls 1, a base 3 and a removable cover (not shown). These concrete elements form a containment which together with the water screens all the radiations from the reactor in known manner and also protects the reactor against detrimental external influences, such as earthquakes and aircraft crashes. The pool water also serves as a heat sink around the reactor.

The reactor has a substantially cylindrical pressure vessel 4 receiving a reactor core 5 having, in known manner, a plurality of fuel element channels 51 receiving fuel elements 50 for the heating of a primary coolant, such as, water. Suitable means (not shown) enable the reactor to be loaded and unloaded and the nuclear reaction in the core 5 to be controlled in known manner. A radiation shield 52 also extends around the core 5. The radiation shield 52, like the core 5, is formed in a bottom part with a number of passages for water which circulates in the core as the primary coolant.

The pressure vessel 4 is double-walled comprising an inner wall 41, an outer wall 42 and an end wall 43 interconnecting the walls 41, 42 so as to define a peripheral chamber 40.

A cover 14 is removably mounted on the pressure vessel 4 and is secured by means of tie rods (not shown) to the end wall 43. The cover 14 comprises a pair of walls in the form of an outer part-spherical member 141, and an inner part-spherical member 142 with a ring 143 interconnecting the two members 141, 142 so as to define a chamber 140 in the cover 14. Thus, the chamber 140 communicates with the chamber 40 by way of means such as bores 145, 45 in the ring 143 and end wall 43. Near the end wall 43, the ring 143 extends into the cylindrical part of the vessel 4, the bores 45, 145 being sealed off from the pool 2 by means of a flange seal 15 and from the pressure vessel interior by means of a radial seal 15'.

The pressure vessel 4, whose longitudinal axis is vertical, merges at the bottom into a spherical base. In addition, a guide wall 44 is disposed in the chamber 40 and secured by way of radial webs 44' to the wall 41.

A secondary cooling circuit is provided for conveying a secondary coolant in heat exchange relation with the primary coolant. This circuit includes a primary heat exchanger 6 disposed inside the vessel 4 and secured by vertical support plates 61 to the cover 14. The heat exchanger 6 is embodied by helically wound tubes 60 which extend around the top part of the core 5 above the radiation shield 52. The tube bunch formed by the tubes 60 screwed into the plates 61 is surrounded by a cylindrical envelope 62 which is connected to the plates 61. A coolant line 9 which extends through the cover 14 and which is connected to the tubes 60 in knwon manner by means of headers (not shown) conveys water heater in the tubes 60 to a secondary heat exchanger 7.

Similarly, a coolant line 9' in which a circulating pump 8 is disposed connects the secondary heat exchanger 7 to the tubes 60 and supplies the tubes 60 with water. The heat exchangers 6, 7, lines 9, 9' and pump 8 therefore form a closed cooling system.

Since the primary heat exchanger 6 is secured to the cover 14, the exchanger 6 is demountable together therewith when the cover 14 is removed. The interior of the pressure vessel 4 is filled with treated demineralized water and has in its top part a gas vent pipe 49 which extends through the cover 14 and through the water in the pool 2.

Distributed over the external circumference of the pressure vessel 4 are a number of vertical cooling ribs 46 which are rigidly secured at their bottom end to a substantially square baseplate 48. The baseplate 48 is formed with a number of apertures 48' which can be seen in FIG. 2 and through which securing elements (not shown) such as bolts extend in order to anchor the reactor to the base 3. The ribs 46 are formed with apertures 47 for the attachment of means for lifting and transporting the reactor. The ribs 46 and plate 48 are designed to form a crushable zone to protect the reactor against external mechanical influences.

Also forming part of the installation is a flood tank 31 whose bottom part is filled with a flowable heat-conducting agent—water in the present case—and whose top part is filled with a flowable heat-insulating agent—in the present case, air taken from the atmosphere through a line 35. The heat-conductive agent has a greater thermal conductivity than the heat-insulating agent. The flood tank 31 thus serves as a source of heat-insulating agent and a source of heat-conducting agent. The air side of the tank 31 communicates with the top part of the chamber 140 in the cover by way of means such as a line 30 in which a blower 10 is disposed. The water side of the tank 31 communicates with the chamber 40 by way of means in the form of an emergency cooling line 17 which extends through the end wall 43 to terminate near the lowest part of the chamber 40. A seal 17' placed around the line 17 in the end wall 43 seals the chamber 40 from the pool 2.

An emergency supply line 33 in which an adjustable check valve 34 is disposed extends into the emergency cooling line 17 between the end wall 43 and the flood tank 31 and can therefore allow water to flow from the pool 2 to the line 17. The flood tank 31 has an intnernal volume of approximately twice the internal volume of the chamber 40 and 140.

An air supply line 35 which comprises a check valve 36 allows air to flow from atmosphere to the line 30.

An electric driving motor 11 drives the pump 8 and blower or fan 10 in common. A pressure sensor 12 connected to the line 9' and operatively connected by way of a signal line 13 to the electric motor 11 supervises the coolant pressure in the cooling system and stops the motor 11 when the pressure drops below a predetermined value. Instead of a common motor 11, one motor each can be provided for the pump 8 and fan 10, in which event the two motors can be switched on and off simultaneously.

The water for cooling the core 5 is supplied through a line 18 which extends from the pressure vessel interior at the lowest part of the wall 41 upwardly through the chamber 40. The line 18 extends through the end wall 43 and the pool water and is sealed in the wall 43 in the same way as the emergency cooling line 17. The line 18 can also be used to remove water from the vessel interior.

Eight sealingly closable inspection openings 19 (FIG. 2) are uniformly distributed over the wall 43 and enable test probes and appliances to be inserted for inspection of the chamber 40.

Figure 3:
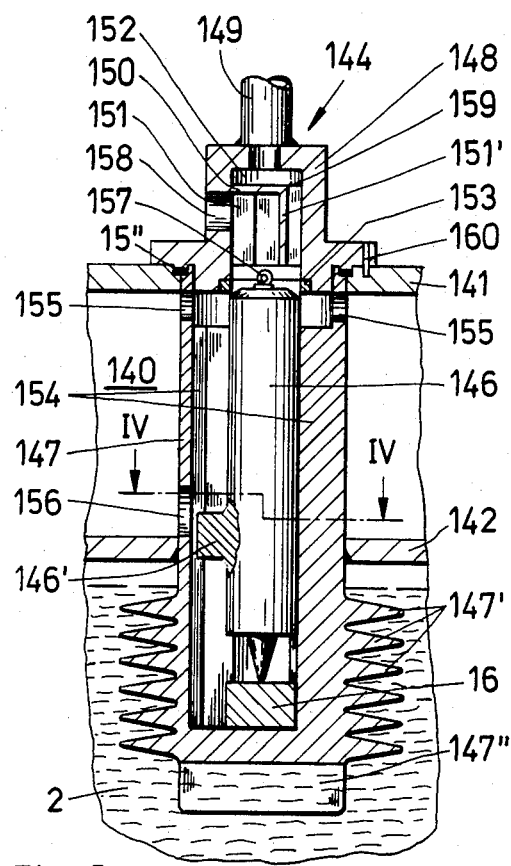
FIG. 3 illustrates a view to a larger scale than in FIG. 1 of a heating reactor safety fuse employing a closure element in accordance with the invention.

Disposed at the center of cover 14 is a fuse 144. As shown in FIG. 3, the fuse 144 comprises a two-piece casing 147, 148, a cylindrical closure element 146 vertically movable in casing 147 and a fusible bearing or support element 16.

Figure 5:
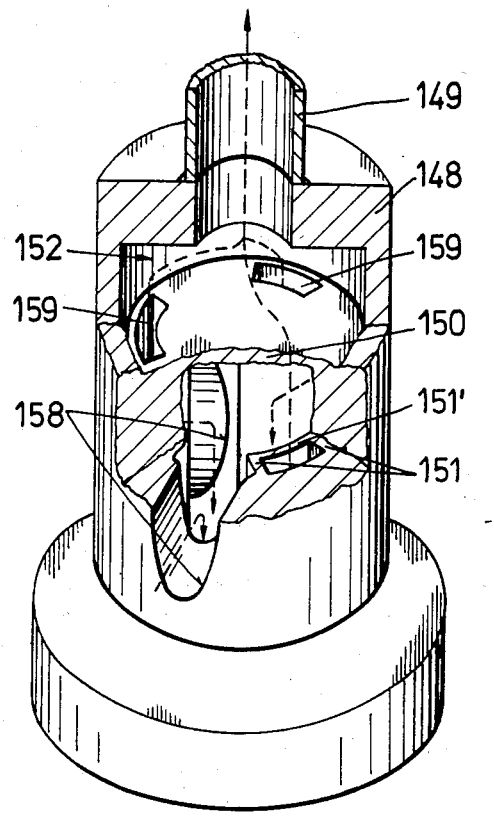
FIG. 5 illustrates a perspective view partly in section of part of the fuse of FIG. 3.
Figure 4:
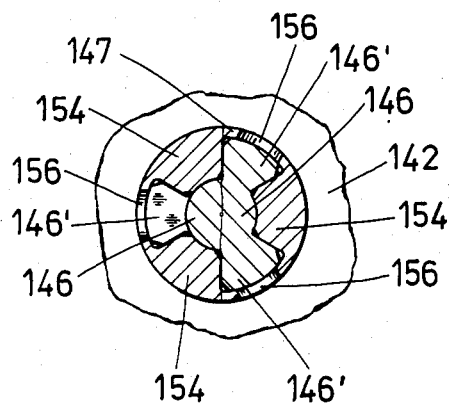
FIG. 4 illustrates a view taken on line IV—IV of FIG. 3.

Referring to FIGS. 3 and 5, a cap 148 of the casing 147, 148 is in the form of a hollow cylinder having an outer flange, secured on the bottom end to enable the cap 148 to be secures, in a manner not shown in detail, to the outer part-spherical member 141 of the cover 14. A vent line 149 is connected to the top end of the cap 148 coaxially thereof and communicates with atmosphere by way of a filter system (not shown). The cap 148 is subdivided internally into six component chambers by six radial walls 151 (see FIG. 5) distributed around the periphery. The component chambers extend over a central zone of the cylinder and terminate at the top at a cross-wall 150. The component chambers are formed alternately with a radial aperture 158 in the cylinder wall and with an axial aperture 159 in the cross-wall 150. The three radial apertures 158 connect the associated component chambers to the pool 2 and the three axial apertures 159 connect the associated component chambers by way of a header chamber 152 to the vent line 149. Disposed at the center of the cap 148 below the cross-wall 150 is a chamber which is open to those three component chambers formed with the apertures 158. The central chamber is isolated from the other three component chambers by walls 151'.

The cap bottom end extends into the casing 147 and is sealed to the outer part-spherical member 141 by means of a seal 15''. A ring seal 153 for the element 146 is disposed on the bottom inner edge of the cap 148. A vertical pin 160 secured to the member 141 extends into a bore in the flange of the cap 148 and ensures that the cap 148 can be fitted only in a single position.

Figure 6:
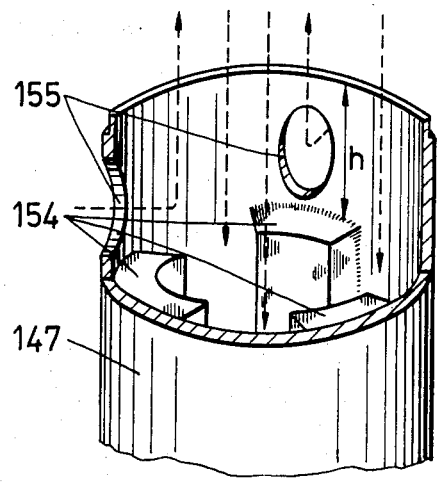
FIG. 6 illustrates a perspective view, also partly in section, of another part of the fuse.

The casing 147 is formed with an axial blind bore open towards the cap 148. The blind bore has three axial guide ribs 154 (FIG. 6) which guide the closure element 146. The ribs 154 start from the base of the casing 147 and stop short of the top thereof by a distance h (FIG. 6) measured from the top end face of casing 147. Each rib 154 is disposed below one of the three apertures 159 in the cap cross-wall 150. Above each rib 154, the wall of the casing 147 is formed with a top radial aperture 155 which extends into the cover chamber 140 near the outer part-spherical member 141. The casing wall is formed between every two ribs 154 with a radial aperture 156 (FIG. 3) which extends into the cover chamber 140 closely above the inner part-spherical member 142. The three apertures 156 are therefore disposed below the radial aperture 158 in the cap 148.

The closure element 146 has a conical sealing surface at the top end which cooperates sealingly with the ring seal 153. At the bottom end of the element 146, there is a conical extension whose downwardly directed apex rests on the fusible element 16 disposed on the base of the blind bore. The closure element 146 can slide readily in the casing 147 at all the relevant temperatures of the heating reactor. The element 16 is made of a tin alloy melting at approximately 230° C. Near the bottom apertures 156, the closure element 146 has three ribs 146' which fill up the space between the three ribs 154 without impairing the mobility of the element 146 and whose top surface is disposed, in the absence of element 16, immediately below the bottom apertures 156. An eye 157 is secured to the top end of the element 146.

The casing 147 has a bottom part extending into the interior of the pressure vessel 4 and provided with external horizontal annular cooling ribs 147' and vertical rectangular cooling ribs 147''. The ribs 147' and 147'' improve heat exchange from the water inside the vessel 4 to the element 16. The surface zone of the blind bore may contact molten material in the event of the element 16 melting and is covered, for example, with a ceramic material which does not readily combine with the molten material, so that the material of the element 16 can be removed readily after a melt.

The installation described operates as follows:

The heating reactor operates in known manner, heat which is produced by the fuel elements 50 heating the water in the pressure vessel 4 and moving the water by convection, so that the water rises in the core 5, is deflected outwardly thereabove, then descends through the primary heat exchanger 6, then goes through passages in the bottom part of the core 5 and radiation shield 52 to return to the fuel elements 50. As the water flows through the exchanger 6, the heat produced by the elements 50 is transferred to the cooling water flowing through the tubes 60. The pump 8 delivers the cooling water through the line 9 to the secondary heat exchanger 7 in which the water gives up its heat, the heat being used for heating, whereafter the cooled cooling water is returned through the line 9' to the primary heat exchanger 6.

In this operation, the fan 10 sucks air from the flood tank 31 and forces the air through the line 30 into the chambers 140, 40. A quantity of water therefore builds up in the tank 31 and possibly in at least some of the emergency cooling line 17. The tank 31 and the line 17 are large enough to receive the entire quantity of water from the chambers 40, 140. A sufficiently high level 32 is ensured in the tank 31 through the agency of the emergency feed line 33 and the adjustable check valve 34.

In the event of cessation of circulation of the cooling water, for example, because of a fault in the pump 8 or motor 11, the pump 8 and the fan are stopped simultaneously. The air pressure in the chambers 140, 40 therefore decreases and the water in the flood tank 31 floods the chambers 140, 40 by gravity, the air being forced into the tank 31 by way of the line 30 and the stationary fan 10 or through a fan bypass which must be opened. The air supply line 35 prevents negative pressure in the tank 31, the check valve 36 preventing any discharge of radioactive substances to atmosphere.

In normal operation, the air-filled chambers 40, 140 ensure good heat insulation between the heating reactor and the pool water, but in the event of a cooling failure, the filling of the chambers 40, 140 with heat-conductive water ensures that heat will be removed from the heating reactor. The water which, in the latter case, heats up on the inner wall 41 then rises between the wall 41 and the guide wall 44 and thus causes an ordered convection flow in the chamber 40 which further improves the transfer of heat to the outer wall 42. The cooling ribs 46 further improve heat transfer from the outer wall 42 to the pool water. If required, the pool water can also be cooled, although this is only an emergency measure since the pool 2 is so large that the amount of heat evolved in any foreseeable disturbances can be absorbed.

The motor 10 can be stopped in dependence upon the temperature, for example, after the secondary heat exchanger 7 or in the pressure vessel 4.

To revert to normal operating conditions after the chambers 40, 140 have been filled with water, all that is necessary is to start the fan 10 so that air is forced through the line 30 into the chambers 40, 140 and the water is displaced therefrom through the emergency cooling line 17 back to the tank 31.

Radiation of course causes the evolution of gases inside the pressure vessel 4 which are removed conventionally through the gas-venting pipe 49.

The fuse 144 provides an additional inherent safety feature which automatically ensures the filling of the chambers 40, 140 with water irrespective of external influences, even with the fan 10 runing, when the temperature in the pressure vessel 4 reaches the critical level of 230° C. At this temperature, the element 16 melts and flows between the ribs 154 so that the closure element 146 descends by gravity. Communication between the casing 147 and the cap 148 is therefore initiated and, by way of the radial apertures 158 in the cap 148, water flows from the pool 2 into the cap 148 and drops down between the ribs 154 to the apertures 156 through which the water then flows into the cover chamber 140 and therefrom through the borew 145, 45 into the chamber 40. After the line 149 has been emptied by the suction effect of the inflowing water, the air displaced from the chamber 40 flows through the top apertures 155—between and in countercurrent to the descending streams of water (separated from the water near the cap 148 by the vertical walls 151, 151')—through the apertures 159 in the cross-wall 150 into the header chamber 152 and therefrom into the vent line 149. The ribs 146' ensure that, during the movement of the element 146, cooling water cannot reach the region of the elements 16 and disturb melting. The little water trickling through the gaps between the ribs 146' and the casing 147 evaporates immediately because of the high temperature and rises back through the gap and, in so doing, opposes further entry of water.

Since the closure element 146 is completely open, it is immaterial whether cooling water descends into the region of the element 16. The self-weight of the element 16 prevents any upwards movement thereof in response to any formation of steam below the ribs 146'.

For the rest, after the fuse 144 has melted, the heating reactor behaves as hereinbefore described for the case in which the fan 10 stops.

Before the reactor can be restarted after a fuse melt, the cap 148 must be removed, the element 146 lifted out of the casing 147 by means of the eye or lug 157 and the molten material of the element 16 must be removed. Thereafter, a new fusible element 16 is introduced into the casing 147 and the fuse 144 reassembled. The height of the element 16 is such as to ensure that the closure element 146 presses on the ring seal 153 with sufficient force.

Another possibility is for the radial apertures 158 to communicate with the bottom part of the flood tank 31 or with the top part of the emergency cooling line 17 so that, in the event of the fuse 144 melting, water from the tank 31 floods the chambers 140,40.

As a variant of the example described, the pump 8 and fan or blower 10 can have various drive means synchronized with one another electrically or electronically or hydraulically or pneumatically. Another possibility is to have multiple redundancy for all the safety features. The fuse can comprise two closure elements, one controlling the entry of water and the other the removal of air.

The emergency cooling line 17 can be restricted so that a relatively high pressure in the chambers 40, 140 opposes any leaks from the pressure vessel interior. Instead of a fuse, other kinds of safety cut-outs can be used to provide an additional inherently safe feature for the heating reactor.

As previously stated, the reactor can be surrounded by a medium other than water and suitable to serve as heat sink. An agent other than water and which is a good heat conductor can be used to flood the chambers 40, 140. Heat insulation other than air can be used, a vacuum serving as a particularly satisfactory heat insulant.

The invention can in theory be applied to all kinds of reactors such as a boiling water reactor, pressure water reactor, gas-cooled reactor, breeder reactor, high-temperature reactor, and so on.

What is claimed is:

1. A nuclear reactor installation comprising
   a pressure vessel having a pair of concentric walls defining a peripheral chamber therebetween;
   a reactor core disposed within said pressure vessel for heating a primary coolant;
   a cooling circuit for conveying a secondary coolant in heat exchange relation with the primary coolant, said circuit including at least one primary heat exchanger within said pressure vessel, at least one secondary heat exchanger outside said pressure vessel, coolant lines extending through said pressure vessel and connecting said het exchanges together, and circulating mens for circulating a secondary coolant through said heat exchangers;
   a heat sink extending around said pressure vessel;
   a source of at least on flowable heat-insulating agent outside said pressure vessel;
   a source of at least one flowable heat-conductive agent outside said pressure vessel;
   first means communicating said source of heat-insulating agent with said peripheral chamber during normal operation of said reactor core; and
   second means communicating said source of heat-conductive agent with said peripheral chamber to fill said chamber with heat-conductive agent in response to a disturbance in reactor core cooling.

2. An installation as set forth in claim 1 which further includes a flood tank disposed geodetically higher than said pressure vessel, said tank receiving water therein as said source of heat-conductive agent and air as said source of heat-insulating agent and having an internal volume greater than the internal volume of said peripheral chamber.

3. An installation as set forth in claim 2 wherein said first means is a blower between said flood tank and a top end of said chamber.

4. An installation as set forth in claim 3 which further comprises a driving motor for driving said blower and said coolant circulating means in common.

5. An installation as set forth in claim 2 wherein said pressure vessel is disposed on a vertical axis, and which further comprises a cover removably mounted on said walls and having a pair of walls defining a chamber therebetween, means communicating said chamber in said cover with said peripheral chamber, a first line communicating the source of air in said flood tank with said chamber in said cover and a second line communicating the source of water in said flood tank with said peripheral chamber at a bottom end thereof.

6. An installation as set forth in claim 5 wherein said coolant lines extend through said cover and an end wall connects said pressure vessel walls at an upper end with said second line passing therethrough.

7. An installation as set forth in claim 6 further comprising a cylindrical guide wall within said peripheral chamber to define a convection flow path for water in said peripheral chamber.

8. An installation as set forth in claim 5 wherein said primary heat exchanger includes a plurality of helically wound tubes and is secured to said cover for removal therewith.

9. An installation as set forth in claim 7 wherein said heat sink is a water-filled pool and which further comprises a check valve communicating said flood tank with said pool for filling said flood tank with water from said pool.

10. An installation as set forth in claim 1 which further comprises a plurality of external cooling ribs on said pressure vessel to define a bearing and transport structure and a crushable zone.

11. An installation as set forth in claim 1 which further comprises a radiation shield about said reactor core and within said vessel.

12. An installation as set forth in claim 1 which further comprises at least one closure element movabel under gravity from a normal operating position sealing said peripheral chamber from the exterior of said vessel to a safety position opening said peripheral chamber to a source of water exterior of said vessel and a bearing element holding said closure element in said normal operating position and being thermally exposed to the interior of said pressure vessel, said bearing being made of fusible material to melt in response to a predetermined safety temperature being exceeded to allow said closure element to move into said safety position.

13. An installation as set forth in claim 12 wherein said closure element is vertically movable and which further comprises a sealing seat for abutting said closure element in said normal position; a first chamber above said sealing seat, at least one vertical wall sub-dividing said first chamber into at least two separate component chambers open towards said seat, at least one radial opening communicating one component chamber with said heat sink and at least one axial opening communicating the other component chamber with atmosphere; and a second chamber below said sealing seat, at least one radial opening communicating a top part of said second chamber with said peripheral chamber and with said axial opening to said other component chamber in said safety position of said closure element, and at least one radial opening communicating a bottom part of said second chamber with said peripheral chamber and with said radial opening to said one component chamber in said safety position of said closure element.

14. In a nuclear reactor installation, the combination comprising
   a pressure vessel having a pair of walls defining a peripheral chamber therebetween;
   a reactor core disposed within said pressure vessel for heating a primary coolant;
   a source of at least one flowable heat-insulating agent outside said pressure vessel;
   a source of at least one flowable heat-conductive agent outside said pressure vessel, said heat-conductive agent having a greater thermal conductivity than said heat-insulating agent;
   first means communicating said source of heat insulating agent with said peripheral chamber during normal operation of said reactor core; and
   second means communicating said source of heat-conductive agent with said peripheral chamber to fill said chamber with heat-conductive agent in response to a disturbance in reactor core cooling.

* * * * *

UNITED STATES PATENT AND TRADEMARK OFFICE
CERTIFICATE OF CORRECTION

PATENT NO. : 4,696,791
DATED : Sept. 29, 1987
INVENTOR(S) : Hermann Straub

It is certified that error appears in the above-identified patent and that said Letters Patent is hereby corrected as shown below:

Column 1, line 30 "het" should be -heat-
Column 1, line 56 "distrubance" should be -disturbance-
Column 4, line 49 "heater" should be -heated-
Column 5, lines 9 and 10 "agen- t" should be -agent-
Column 5, line 28 "intnernal" should be -internal-
Column 5, line 62 "flange, secured" should be -flange secured-
Column 5, line 63 "secures" should be -secured-
Column 7, line 66 "runing" should be -running-
Column 8, line 8 "borew" should be -bores-
Column 8, line 64 "insulation" should be -insulants-
Column 9, line 16 "het" should be -heat-
Column 9, line 17 "mens" should be -means-
Column 9, line 20 "on" should be -one-
Column 10, line 16 "movabel" should be -movable- Signed and Sealed this Twenty-ninth Day of March, 1988

Attest:

DONALD J. QUIGG

Attesting Officer

Commissioner of Patents and Trademarks